United States Patent [19]
Bates

[11] Patent Number: 6,096,388
[45] Date of Patent: *Aug. 1, 2000

[54] RADIATION CURED COATINGS

[75] Inventor: Robert Ernest Bates, Auckland, New Zealand

[73] Assignee: A J Bates Limited, Auckland, New Zealand

[*] Notice: This patent is subject to a terminal disclaimer.

[21] Appl. No.: 09/227,735

[22] Filed: Jan. 8, 1999

Related U.S. Application Data

[62] Division of application No. 08/820,024, Mar. 19, 1997, Pat. No. 5,871,824.

[30] Foreign Application Priority Data

Mar. 19, 1996 [NZ] New Zealand .............................. 286219
Aug. 16, 1996 [NZ] New Zealand .............................. 299189

[51] Int. Cl.[7] ...................................................... B05D 3/06
[52] U.S. Cl. ........................ 427/518; 427/520; 427/340; 427/407.1
[58] Field of Search ..................................... 427/493, 518, 427/520, 340, 407.1

[56] References Cited

U.S. PATENT DOCUMENTS 4,200,762  4/1980  Schmidle .................................. 560/26

FOREIGN PATENT DOCUMENTS 2145640  4/1985  United Kingdom .

Primary Examiner—Erma Cameron
Attorney, Agent, or Firm—Jacobson, Price, Holman & Stern, PLLC

[57] ABSTRACT

A time and labour saving multiple coating system for porous substrates which involves the application of a mono or poly isocyanate catalysed UV curable acrylate composition in such circumstances as to penetrate at least part of the surface of the substrate, at least a partial surface curing of the applied composition prior to any substantial degree of self curing, and thereafter applying (whether subsequent to any sanding or not) a further surfacing composition which preferably also is an acrylate composition that is both self curing and UV curable.

22 Claims, 13 Drawing Sheets

FIBRE CEMENT SHEET OPERATION SEQUENCE
PRIME (A)
*Preferred option*

Line speed 5/30 metres per minute

FIBRE CEMENT SHEET OPERATION SEQUENCE
PRIME (B)
*Second option*

Line speed 5/30 metres per minute

FIBRE CEMENT SHEET OPERATION SEQUENCES
(C)

Line speed 5/30 metres per minute

UV SYSTEMS FOR SHUTTER PANEL SYSTEM ON PLYWOOD
(B)

Line speed 5/30 metres per minute

UV SYSTEMS FOR SHUTTER PANEL SYSTEM ON PLYWOOD
(C)

Line speed 5/30 metres per minute

UV SYSTEMS FOR SHUTTER PANEL SYSTEM ON PLYWOOD
TWO COAT OPERATION ONLY (D)

line speed 5/30 metres per minute

UV SYSTEMS FOR SHUTTER PANEL SYSTEM ON PLYWOOD
(E)

Line speed 5/30 metres per minute

UV SYSTEMS FOR SHUTTER PANEL SYSTEM ON PLYWOOD

Line speed 5/30 metres per minute

UV SYSTEMS FOR SHUTTER PANEL SYSTEM ON PLYWOOD
ONE COAT SAND, ONE COAT FINISH (E)

Line speed 5/30 metres per minute

UV SYSTEMS FOR SHUTTER PANEL SYSTEM ON PLYWOOD
(A)

Line speed 5/30 metres per minute

OIL TEMPERED HARDBOARD OPERATION SEQUENCE
PRIME (A)
*MDF, Particleboard, Bison board, Wood Veneer, Plywood, Oriented Stand board*
*Preferred option*

Line speed range 5/30 metres per minute

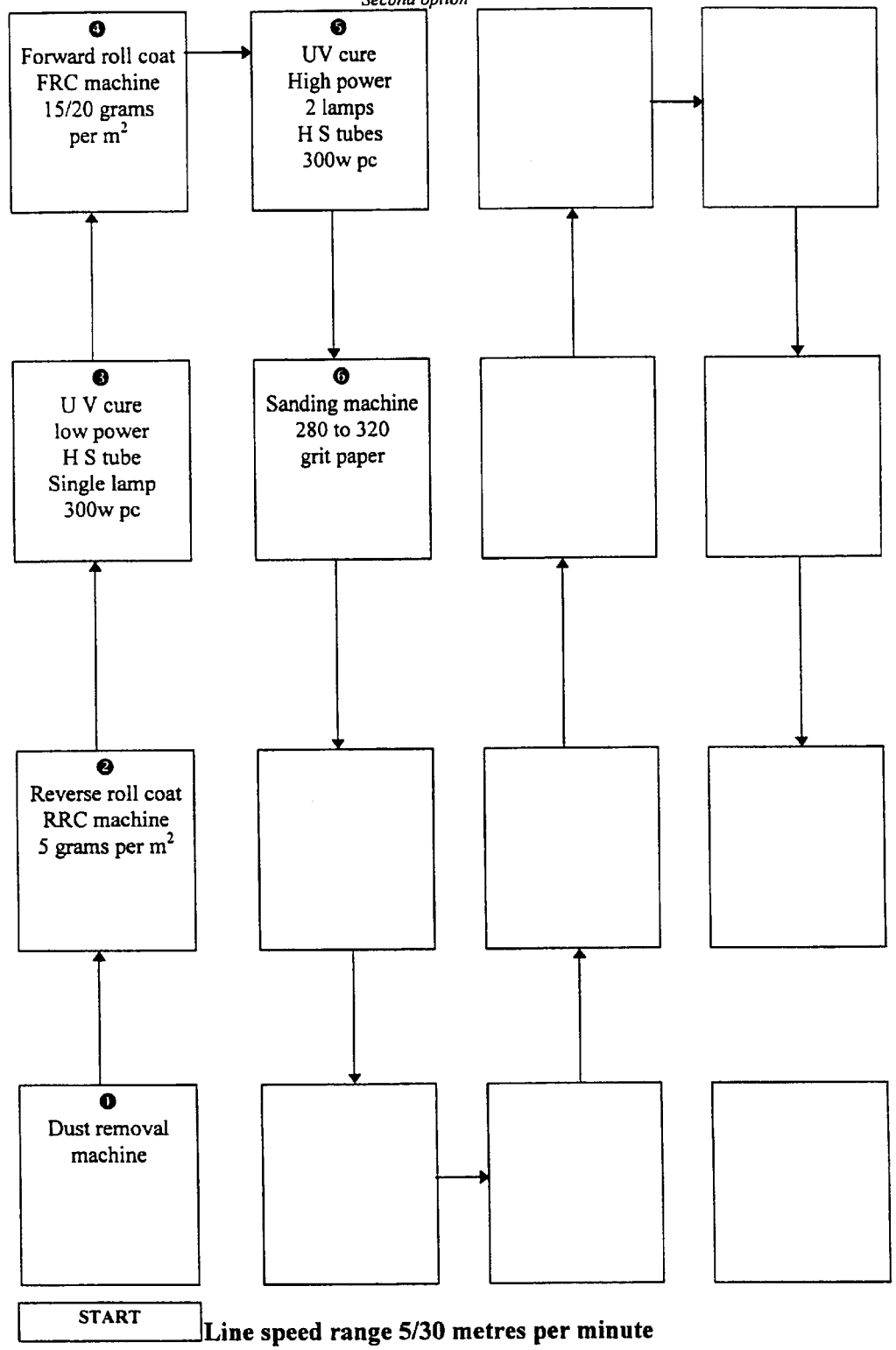

RADIATION CURED COATINGS

This is a divisional of application Ser. No. 08/820,024 filed Mar. 19, 1997 now U.S. Pat. No. 5,871,824.

The present invention relates to UV cured coatings.

UV cured coatings are almost 100% solids and are cost effective alternatives to the less environmentally friendly two pack polyurethanes that have been traditionally used in wet wall linings. Such coatings are known to rely on activation by a mercury vapour lamp to cause photo initiators in the coating to release free radicals. The free radicals interact with unsaturated monomer and resin causing them to polymerise into a solid cured film.

When panels such as fibre cement are coated it is difficult to achieve good adhesion between a UV cured primer and the fibre cement panel. This is because the fibre cement is porous and the UV curable coating soaks into the surface where the UV emissions cannot reach. This means that the UV primer cannot be properly cured.

The present invention addresses regimes of coating a substrate (preferably having at least some surface porosity) which nevertheless allow the advantages to be derived from a UV cured coating to be retained while at the same time ensuring appropriate adhesion between any chosen substrate and the sequence of coatings thereon.

The present invention also addresses such coated substrates as well as apparatus and related means and methods applicable thereto.

In one aspect the invention consists in a method of coating a substrate (preferably having at least some surface porosity), said method comprising the steps of (I) at least applying to the surface of the substrate a mono or poly isocyanate catalyses UV or other radiation (hereinafter "UV") curable acrylate composition by means of
  (i) serial application of
    (a) a liquid carried substantially solvent free mono or poly isocyanate catalyst, and
    (b) the UV curable acrylate composition, or
  (ii) an application of a mixture of a substantially solvent free mono or poly isocyanate catalyst and the acrylate composition;

(II) photo curing at least the surface of the coating applied as (I);

(III) optionally, mechanically treating the cured surface resulting from (II);

(IV) applying to the surface resulting from (II) or (III)
  (i) a UV curable composition, and/or
  (ii) serially
    (a) a liquid carried substantially solvent free mono or poly isocyanate catalyst, and
    (b) a UV curable acrylate composition, and/or
  (iii) a mixture of a substantially solvent free mono or poly isocyanate catalyst and the acrylate composition; and (V) photo curing at least the surface of the coating(s) applied as (IV).

Preferably said substrate has a porous surface.

Preferably said substrate is of a fibre cement, e.g., Portland based.

Preferably said catalyst of step (I) is a diisocyanate.

Preferably said diisocyanate is aromatic or aliphatic.

Preferably said diisocyanate is polymethylene.

In other forms the catalyst is any catalyst of general formula R—(N=C=O)n where R is an organic moiety and n is any integer 1 or greater.

Preferably said catalyst is carried by a non solvent [i.e., for the R—[N=C=O]n] organic compound or composition.

Preferably said liquid carried catalyst is carried by a monomer.

In some forms step (I) comprises the application of plural catalysed and UV curable acrylate coatings, the first being by means of one of (I) (i) and (I) (ii), and the second, the same or different, being by means of one of (I)(i) and (I)(ii).

Preferably said photo curing is with UV light. In less preferred forms any other activating radiation can be used (e.g., gamma).

Preferably step (III) is performed.

Preferably step (III) is or includes sanding (with or without washing).

Preferably where step (IV)(i) is used the UV curable composition is an acrylate composition or compound. Preferably where step (IV)(ii) is used
said catalyst is a diisocyanate or as otherwise defined in respect of step (I) and/or
said UV curable acrylate composition is as defined in respect of step (I) or otherwise.

Preferably where step (IV) (iii) is used the catalyst and acrylate composition are as defined in respect of step (I) or otherwise.

Preferably only one of steps (IV) (i), (ii) or (iii) are used, or only two thereof.

In other forms a step (VI) follows which comprises the application of at least one compatible coating over the cured layer of (V), the coating(s) of the substrate by steps (I) through (V) priming the substrate.

Step (VI) may include mechanical and/or chemical treatments to modify surface appearance and/or characteristics.

Preferably said substrate is a panel of fibre cement.

In some forms said substrate includes some free water inclusions.

In still a further aspect the invention consists in a coated substrate comprising (A) a substrate having some surface porosity, (B) below and at least partly above the surface of the substrate of a mono or poly isocyanate catalysed or UV light catalysed acrylate composition, the regions further into the substrate being more mono or poly isocyanate catalysed than at or above the substrate surface, and, conversely, the at or above surface regions being more UV light cured than the regions further into the substrate, and (C) at least one (at least primarily) UV cured acrylate coating on the cured composition of (B).

In still a further aspect the present invention consists in a method of coating a substrate, said method comprising at least the steps of (I) at least applying to the surface of the substrate a mono or poly isocyanate catalysed UV or other radiation (hereinafter "UV") curable acrylate composition which is also self curing by means of
  (i) serial application of
    (a) a liquid carried substantially solvent free mono or poly isocyanate catalyst, and
    (b) the UV curable acrylate composition, or
  (ii) an application of a mixture of a substantially solvent free mono or poly isocayanate catalyst and the acrylate composition;
the application by (I) (i) or (ii) providing a composition having from 2.5 to about 10% v/v of the catalyst, (II) photo curing at least to a substantial extent at least the surface of the coating applied as (I) prior to any substantial degree of self curing;

(III) "sanding" the cured surface resulting from (II);
(IV) applying to the surface resulting from (III)
   (i) a UV curable composition, and/or
   (ii) serially
      (a) a liquid carried substantially solvent free mono or poly isocyanate catalyst, and
      (b) a UV curable acrylate composition, and/or
   (iii) a mixture of a substantially solvent free mono or poly isocyanate catalyst and the acrylate composition; and
(V) allowing the curing of or curing (optionally photocuring) at least the surface of the coating(s) applied as (IV).

In still a further aspect the present invention consists in a method of coating a substrate, said method comprising at least the steps of
(I) at least applying to the surface of the substrate a mono or poly isocyanate catalysed UV or other radiation (hereinafter "UV") curable acrylate composition which is also self curing by means of
   (i) serial application of
      (a) a liquid carried substantially solvent free mono or poly isocyanate catalyst, and
      (b) the UV curable acrylate composition, or
   (ii) an application of a mixture of a substantially solvent free mono or poly isocyanate catalyst and the acrylate composition;
the application by (I) (i) or (ii) providing a composition having from about 15 to about 30% v/v of the catalyst,
(II) photo curing at least to a substantial extent at least the surface of the coating applied as (I) prior to any substantial degree of self curing,
(III) applying to the surface resulting from (II)
   (i) a UV curable composition, and/or
   (ii) serially
      (a) a liquid carried substantially solvent free mono or poly isocyanate catalyst, and
      (b) a UV curable acrylate composition, and/or
   (iii) a mixture of a substantially solvent free mono or poly isocyanate catalyst and the acrylate composition; and
(VI) allowing the curing of or curing (optionally by photocuring) at least the surface of the coating(s) applied as (III).

Preferably where any of the steps (I), (II), (III), (IV) and (V) are present, they are performed on a production line at a line speed of from 5 to 30 m/min.

Preferably step (I) results in an application of composition at a rate of from 5 to 50 gsm.

Preferably when the layer of step (I) is not subjected to a "sanding" step the catalyst content is lower in the outer layer(s).

In yet a further aspect the invention consists in apparatus for performing the method of the present invention, said apparatus comprising
(I) means to apply a composition or composition components to a substrate in accordance with step (I),
(II) means to photo cure as in step (II) the coated substrate of step (I),
(III) optional, means to mechanically treat the at least partially cured coated substrate of step (II),
(IV) means to apply to the surface resulting from step (II) or step (III) a composition or composition components as required by step (IV), and
(V) optional, means to photo cure the coating(s) of step (IV).

The invention involves as an option, a method of coating panels especially building panels comprising preparing a face of the panel by
(a) applying to said face a coating of an aromatic or aliphatic isocyanate; or the latter blended with a UV curable primer,
(b) applying a primer over the isocyanate coat, said primer containing a monomer, a photo initiator and optionally a higher molecular weight resin, and
(c) exposing the primer coat to UV radiation to cause the primer to polymerise into at least a substantially surface cured coat.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following give examples.

The panel faces may be coated by spraying, curtain coating or rolling. The isocyanate may be R—N=C=O where R is an aryl, diaryl or aliphatic group. The compound may be a diisocyanate. The aliphatic group may be a lower alkyl The aliphatic group may be polyethylene. The isocyanate is preferably a high solids, film forming preparation. The primer may contain aqueous suspensions of monomer and a photo initiator.

Optionally a primer resin may be present to give the coat increased density. Pigment may also be present. The purpose of this coat is like all primers, to establish high initial adhesion to the substrate so that subsequent coats achieve reliable intercoat adhesion. Preferably the coats are applied at 5–50 gsm preferably 20–30 gsm and ambient temperature.

This process works better if the substrate has some porosity with either water content or -OH groups. Manufactured boards are suitable with a fibre content, including fibrocement.

In a following stage (D) the primer may be exposed to UV light in order to activate the photo initiators in primer. The free radicals released thereby are free to cross link the monomers and promote curing. If the isocyanate coat has not occluded the substrate surface the primer layer may penetrate the substrate where the monomers are free to link with the isocyanate coat. The unreacted isocyanate groups from the initial coat are free to link with the monomers in the second coat.

Boards may be sold in this condition, namely primed. Alternatively the boards may proceed to top coating or other finishing.

Fibrocement sheets 2400×1200 mm are used to line wet areas such as abattoirs, showers, spray booths and industrial work places. We have succeeded in coating them with a production line consisting of a series of coating stations with a throughput speed of 5 to 30 m/min (e.g., 10 m/min) using the following stages:

Stage 1

The first station has a 50 inch wide driven applicator 4 roll which creates a nip with the station work surface 6. The applicator is supplied with a Bayer hexamethylene diisocyanate available as DESMODUR N 3400 at a rate which deposits 10 gsm. The panel progresses to station 2 where infra red lamps 8 dry the coat which sinks into the panel surface and combines with moisture in the panel and any free -OH in the panel surface.

Stage 2

The panel progresses to the third station where a drive/applicator roller 10 deposits 5 to 30 gsm of a non-pigmented acrylic primer containing monomer, high mol. wt. Resins and photo initiators. The applicator roller feeds the panel and applies the primer to the dry panel.

Stage 3

The primed panel is transferred to a station where an array of UV lamps are switched on exposing the whole panel surface for a few seconds.

Stage 4

The panel receives a second coat of primer at a feed station where the feed direction is contrary to the roll applicator direction. This applicator is intended to fill the voids in the panel surface. Application rates fall to 5–10 gsm.

Stage 5

The panel receives UV cured sanding primer coat at 15 to 30 gsm followed by UV exposure as described above. Feeding through a fine grit (180 to 320, e.g., #220) belt sander is then necessary to prepare the coated panel for finishing coats. Pigmented primers are used in alternative processes.

A preferred fibrocement is that of James Hardie Building Products Limited of Auckland, New Zealand marked as HARDIFLEX™. It is a flat medium density cellulose reinforced autoclaved cement sheet produced on a Hatschek machine followed by autoclave curing.

A hardboard substrated suitable is that of Fletcher Wood Panels Limited of Auckland, New Zealand which their technical information sheet "Hardboard" defines as an oil tempered high density wood fibre panel.

The process is also effective when used on other suitably prepared substrates, e.g., timber, fibreboard, cement board, other wood based products and metal.

We have found the advantages of the above procedure/example:

1 Superior adhesion between the initial coat and the substrate.
2 Superior adhesion between intermediate coats.
3 Cross linking between the UV curable coat and initial coat.
4 Labour cost and handling are reduced.
5 Environmentally much more friendly.

BRIEF DESCRIPTION OF THE DRAWINGS

The aforementioned procedure of the present invention will now be described in more detail and with different preferments and/or options with reference to the following drawings in which FIG. 13 is another option for oil tempered hardboard where the substrate is as stated in relation to FIG. 12.

Figure 1:
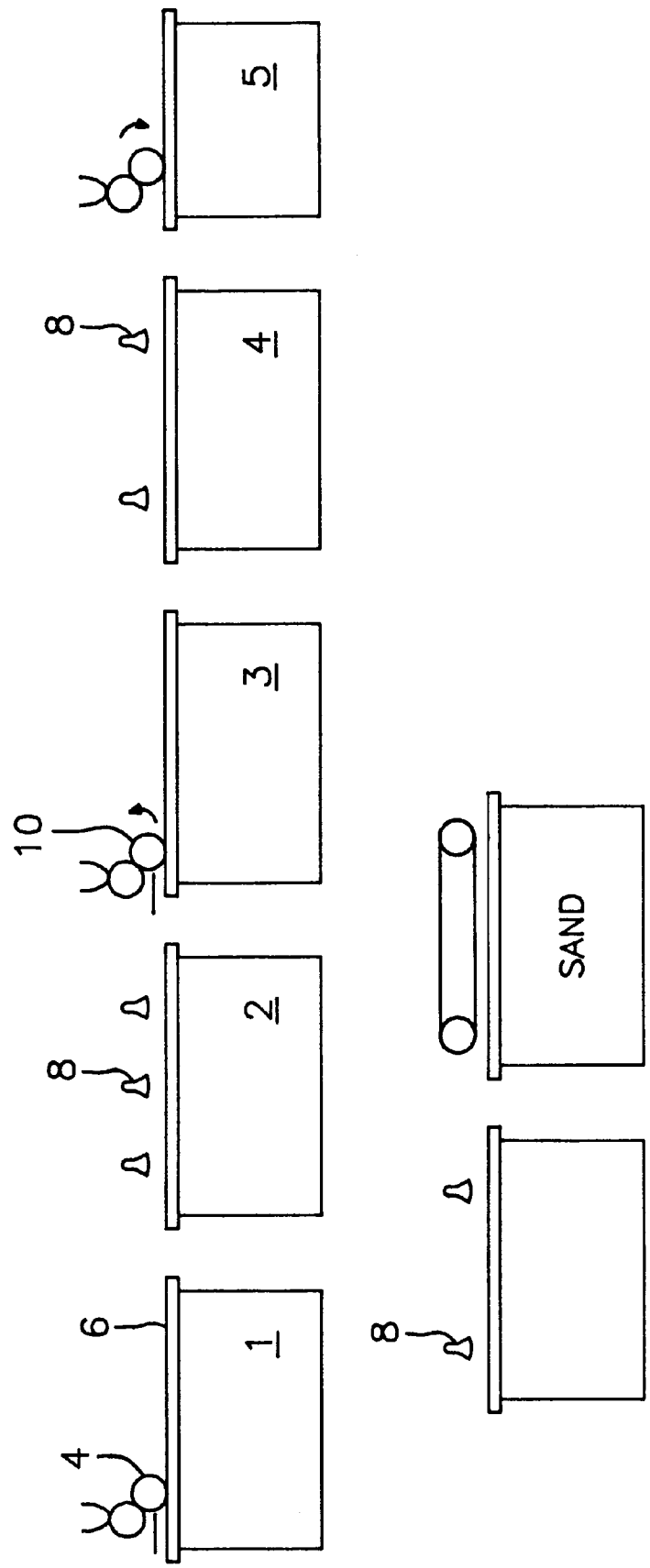
FIG. 1 is a diagram of an apparatus as depicted in the drawing accompanying the provisional specification of our New Zealand Patent Application 286219.
Figure 2:
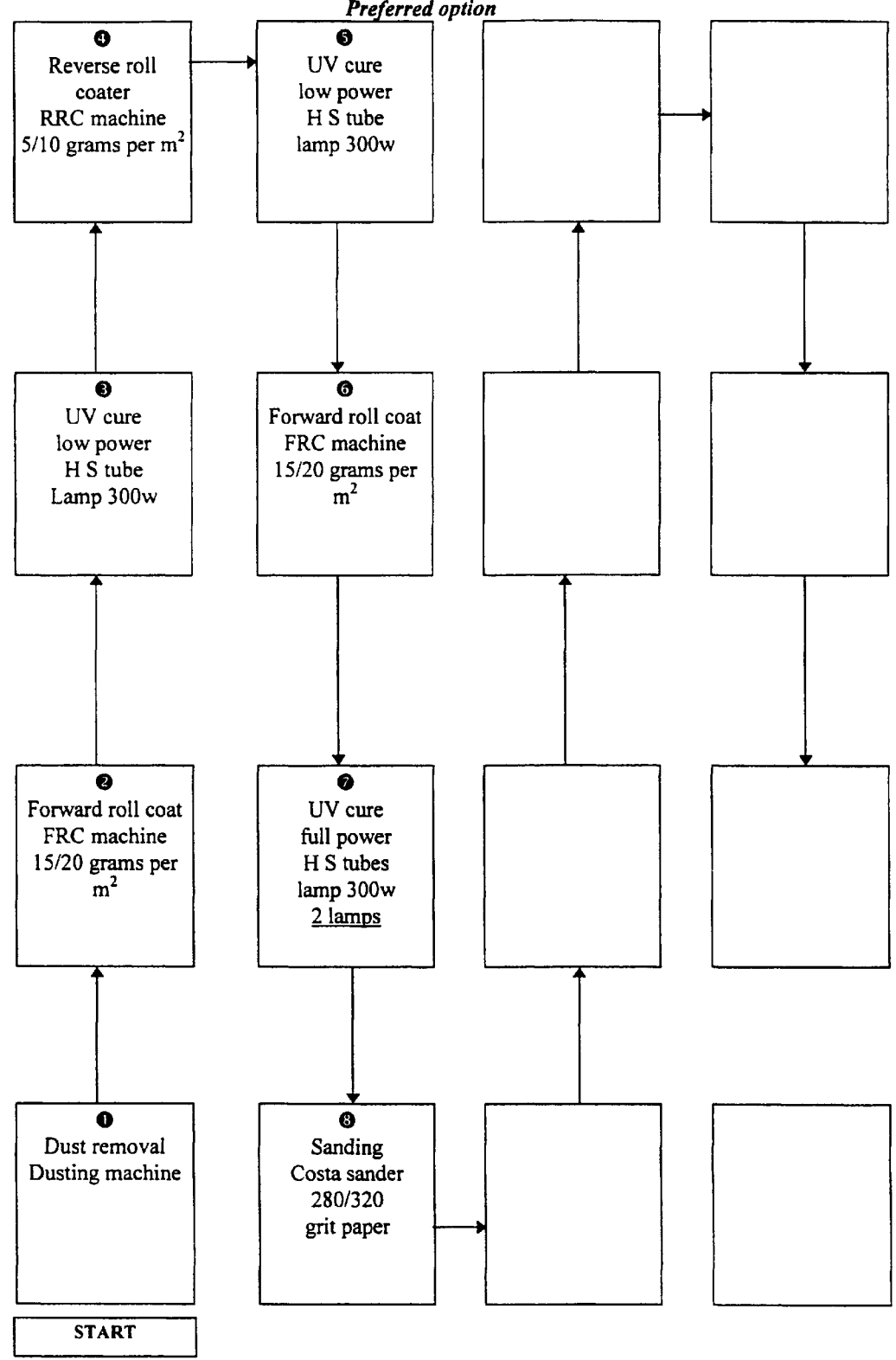
FIG. 2 is a preferred flow diagram at least to a surface preparation stage which lends itself to following surface treatments (i.e., FIG. 2 showing details of a preferred method of operation in relation to the preparation of fibre cement sheet)
Figure 3:
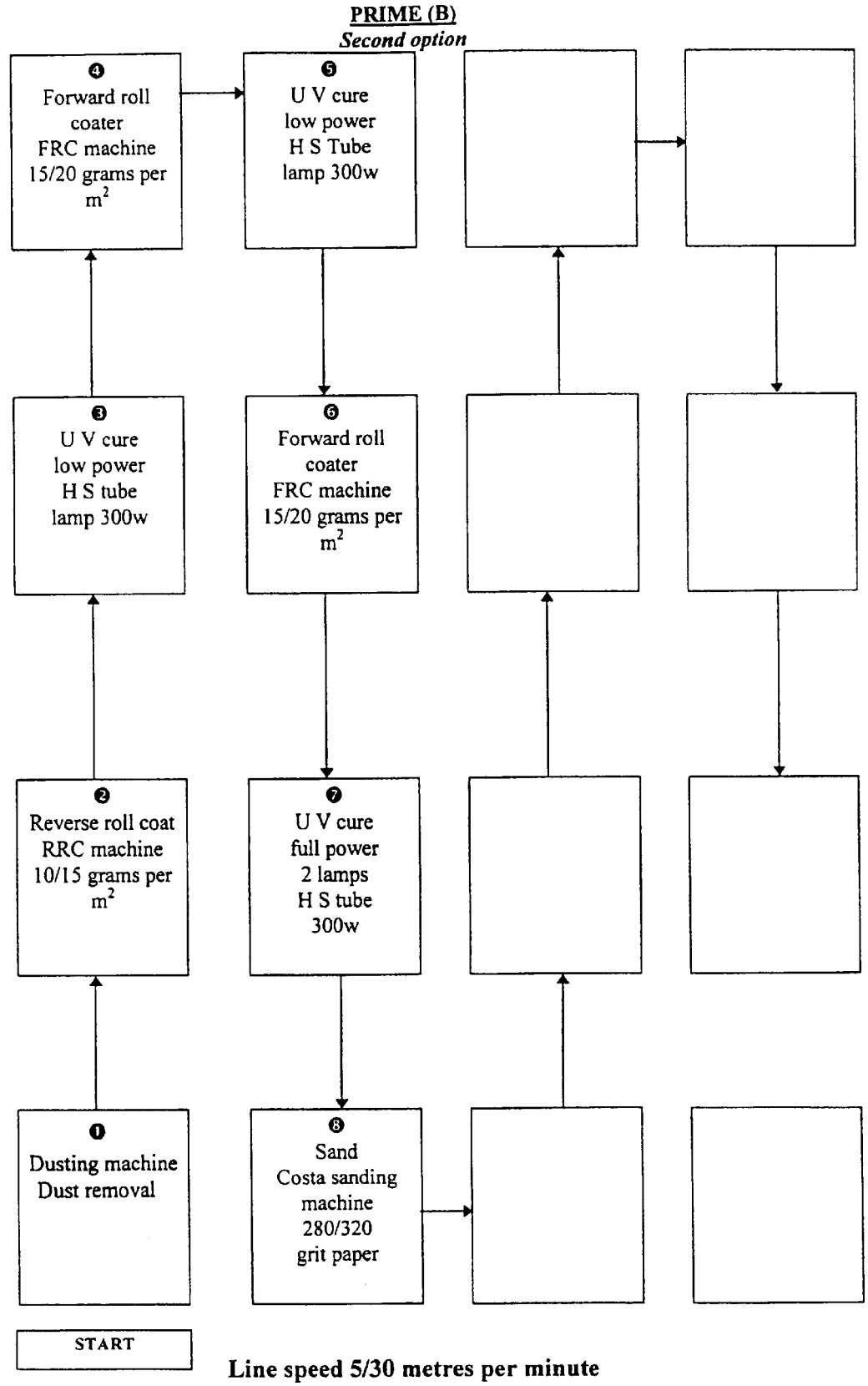
FIG. 3 is a variation of the procedure of FIG. 2.
Figure 4:
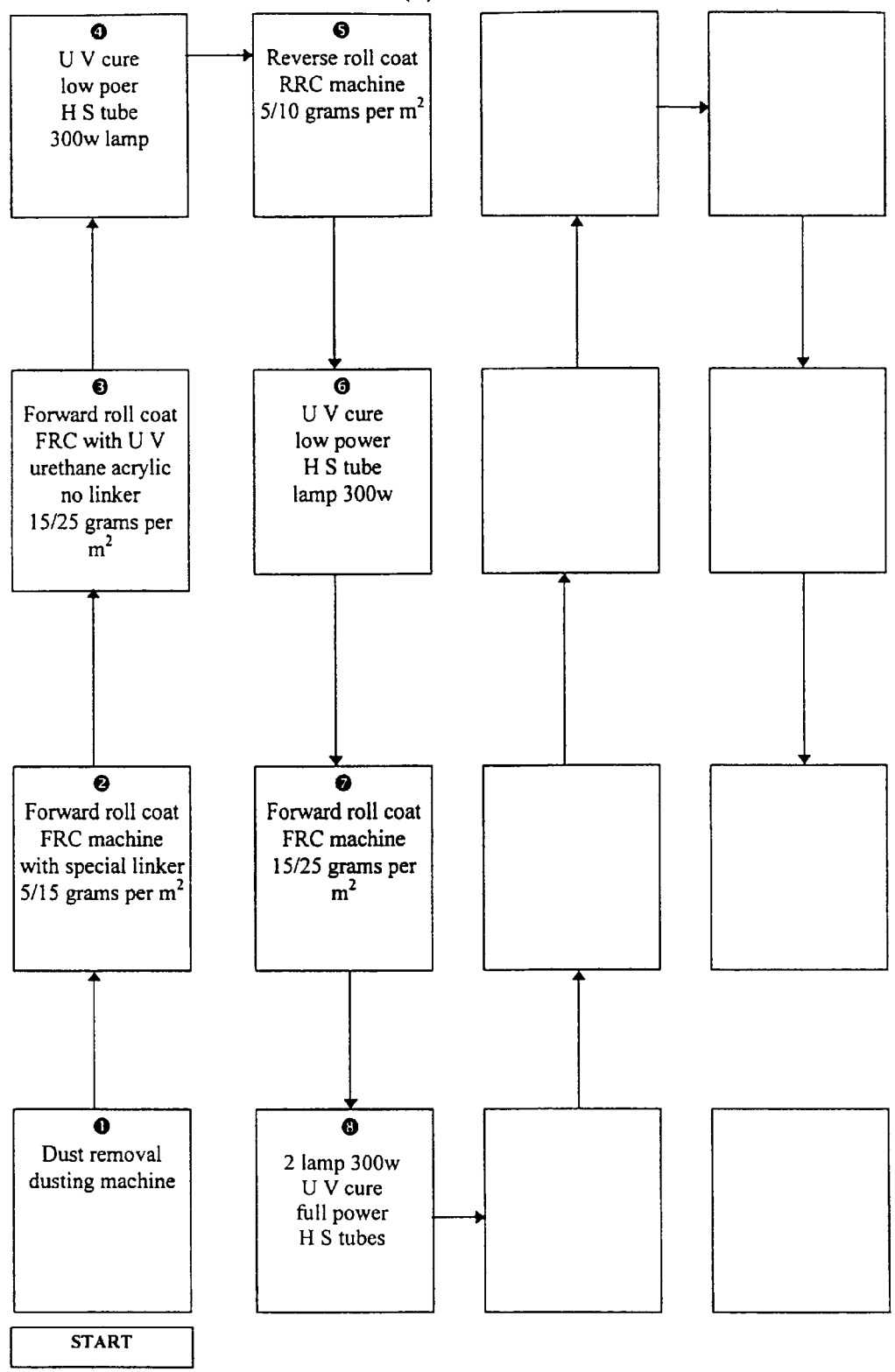
FIG. 4 shows a third option for fibre cement.
Figure 5:
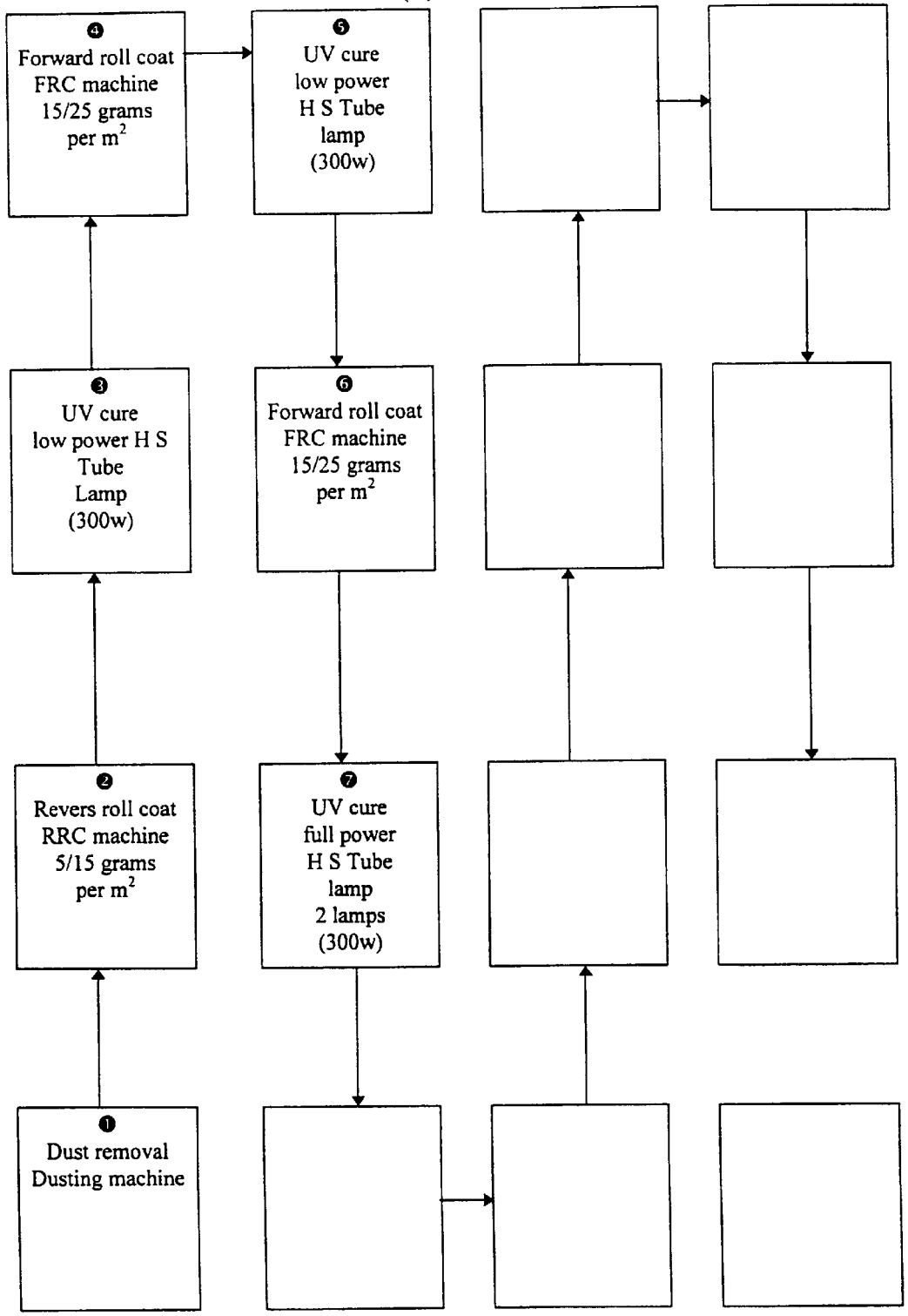
FIG. 5 shows a preferred option for coating plywood to provide a shutter panel (i.e., where the substrate is plywood)
Figure 6:
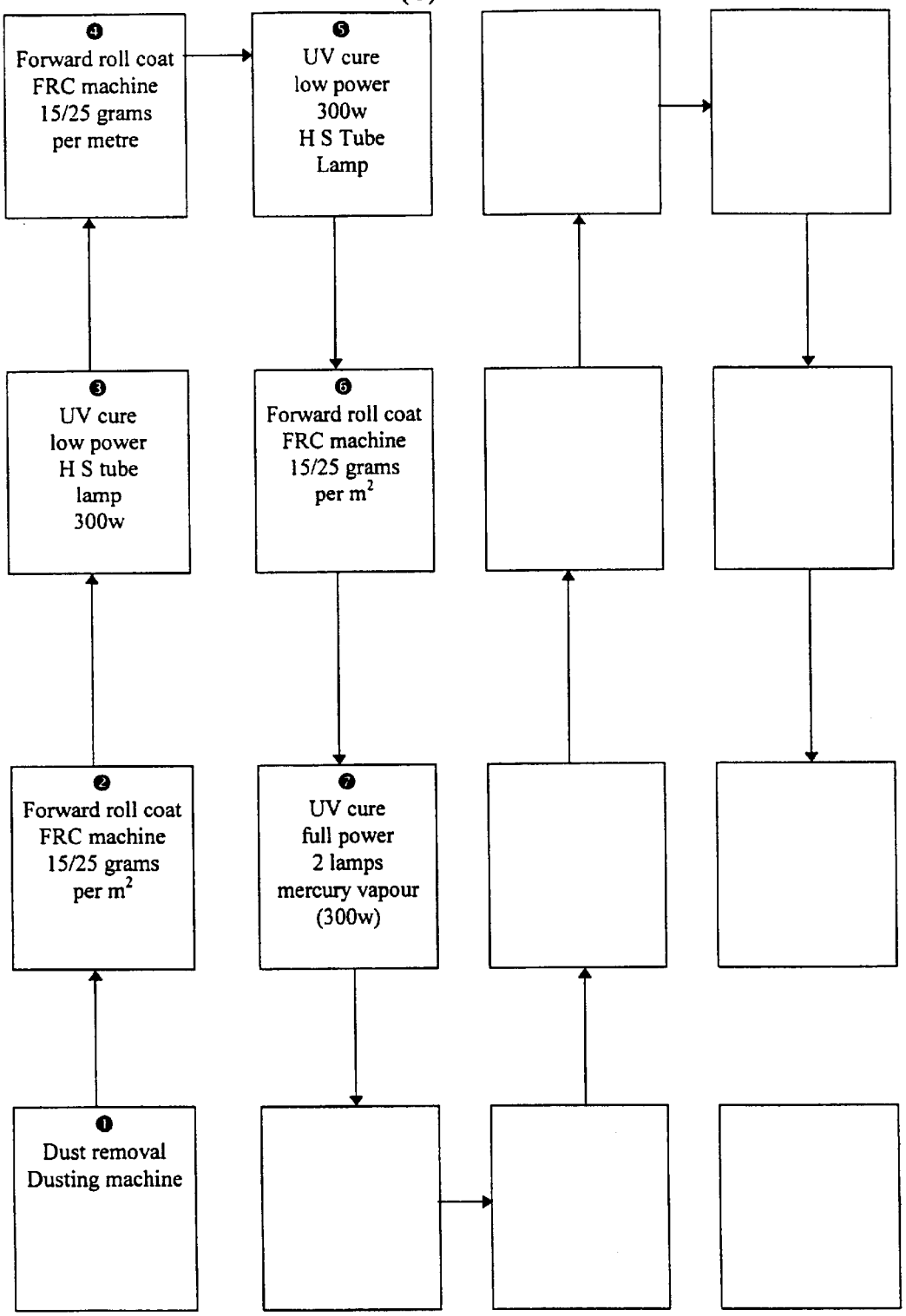
FIG. 6 is a variant of the procedure of FIG. 5 where the product is a shutter panel and the substrate is plywood.
Figure 7:
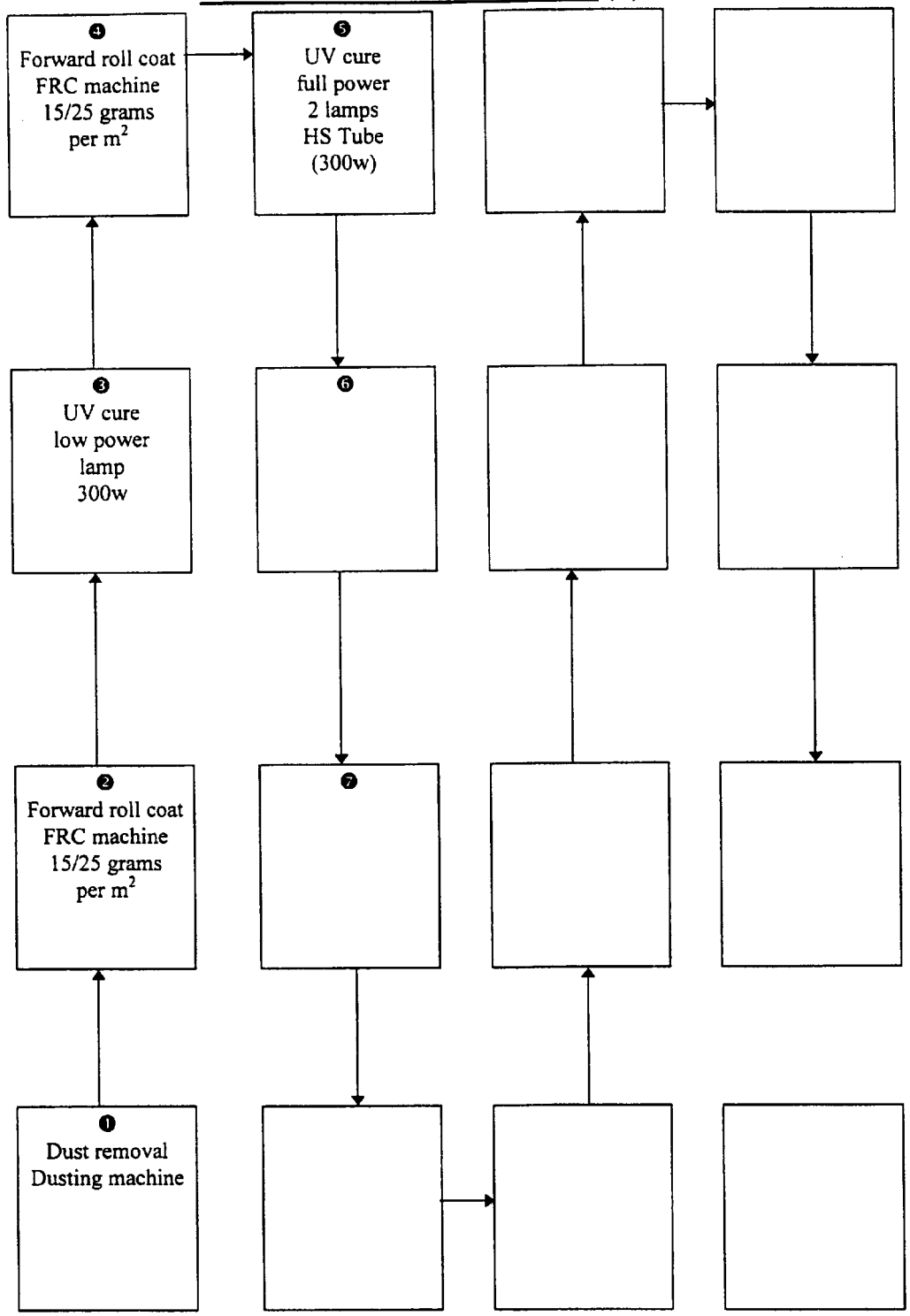
FIG. 7 shows a flow diagram involving a two coat operation only where the substrate is plywood and the output product is a shutter panel.
Figure 8:
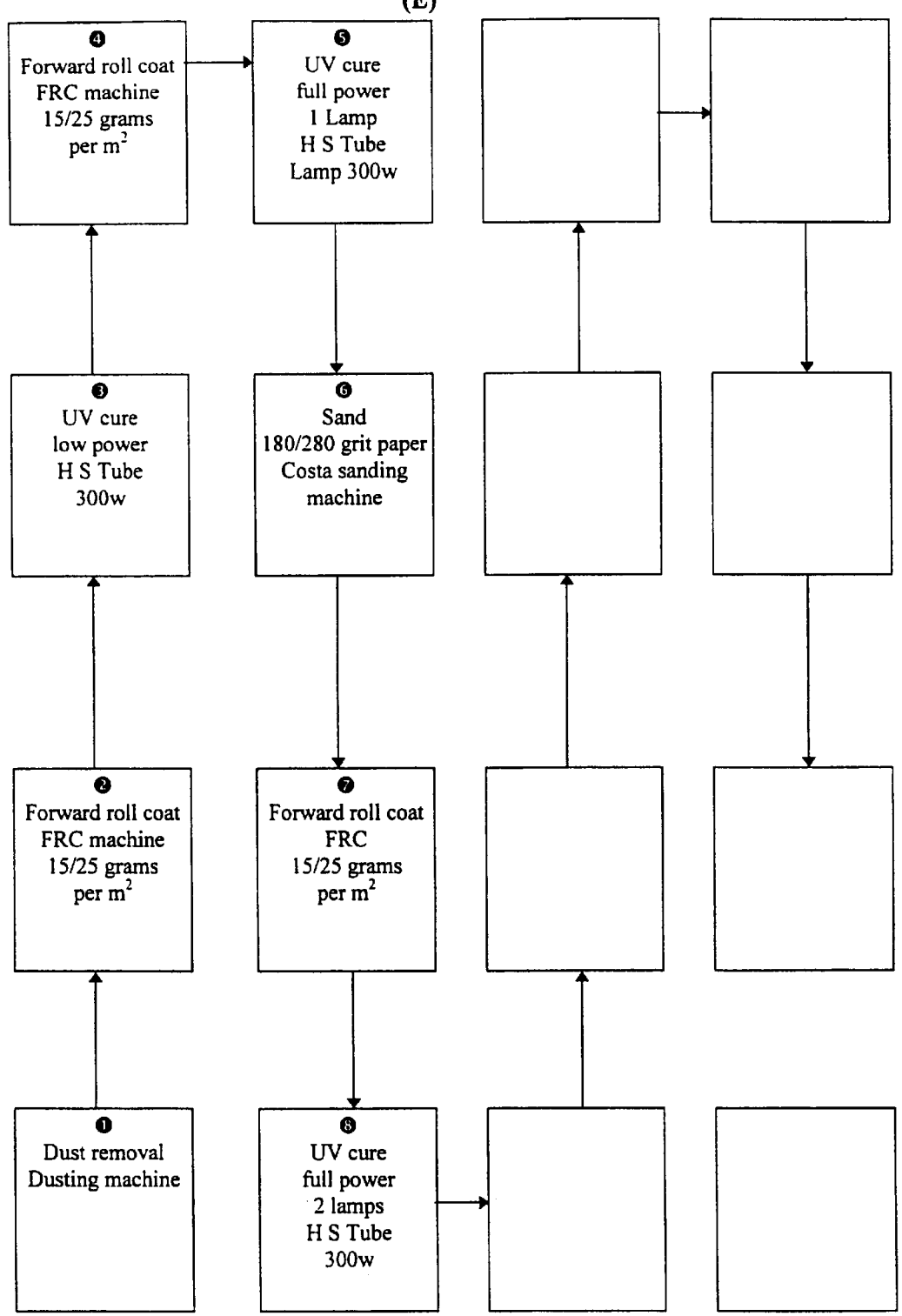
FIG. 8 is a further procedure where the substrate is plywood and the output product is a shutter panel system.
Figure 9:
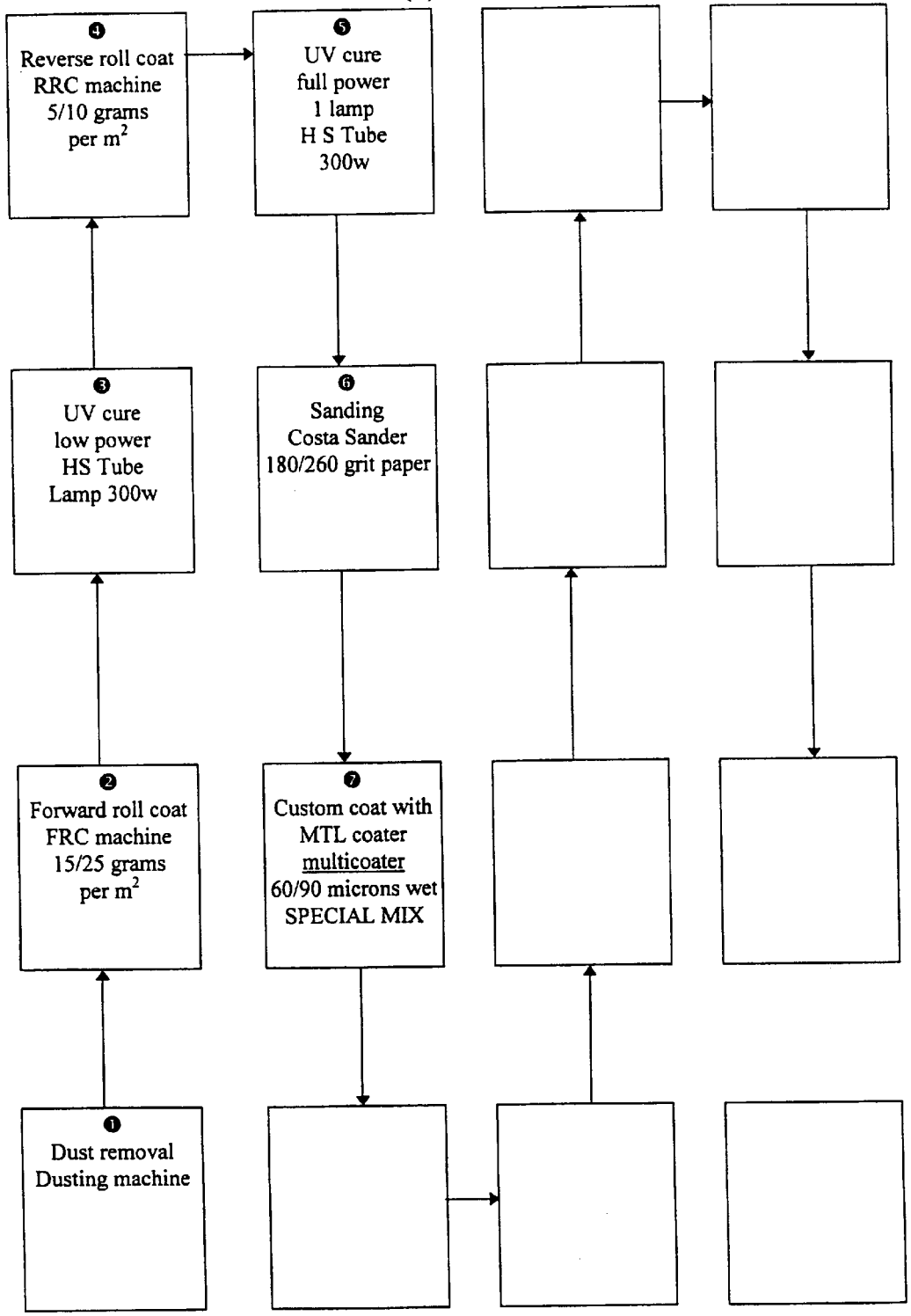
FIG. 9 is still a further variant where the substrate is plywood and the output product is a shutter panel system.
Figure 10:
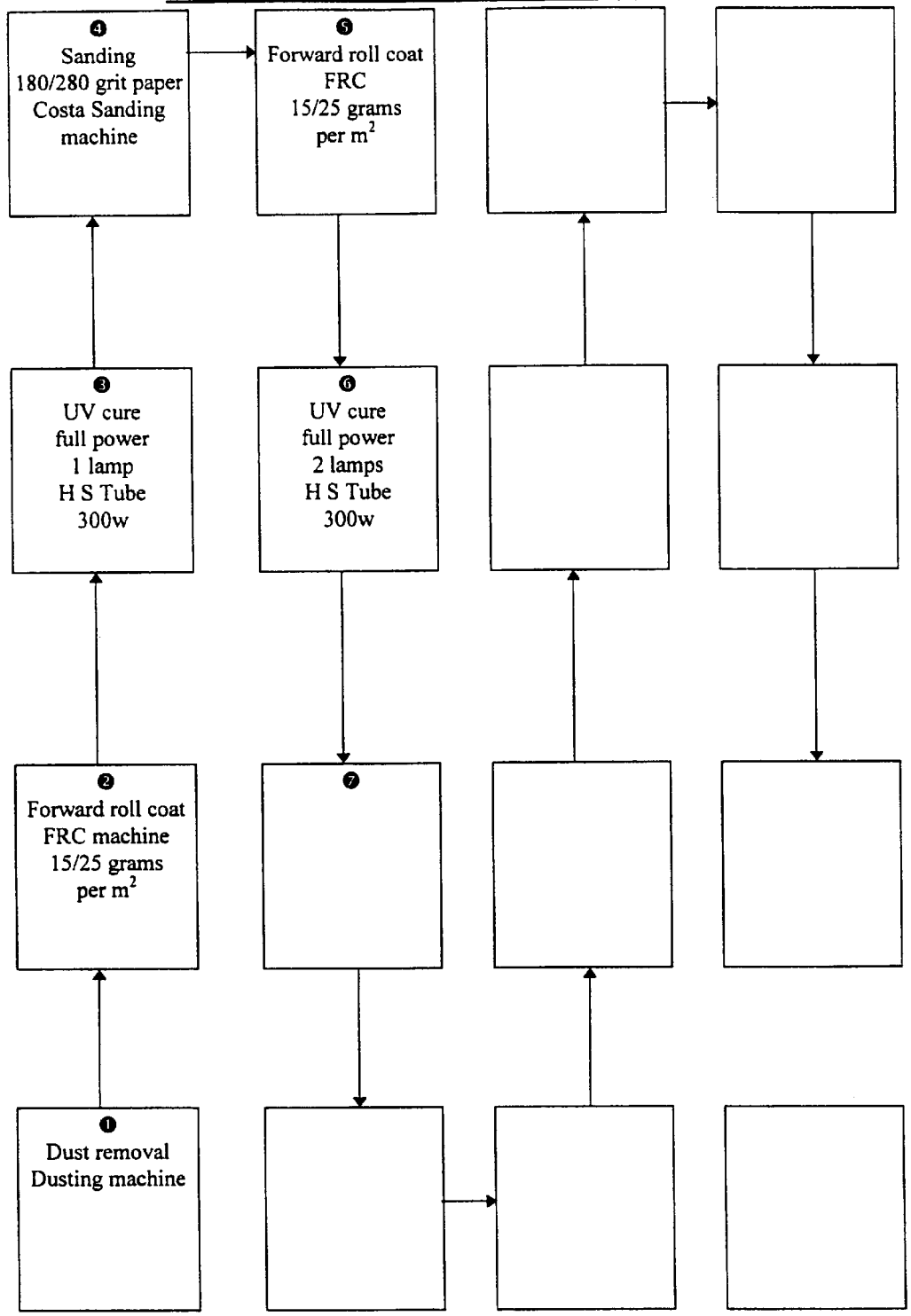
FIG. 10 is still a further variant flow diagram where the substrate is plywood and the output product is a shutter panel system, this time there being a one coat followed by a sanding and then a one coat finish application.
Figure 11:
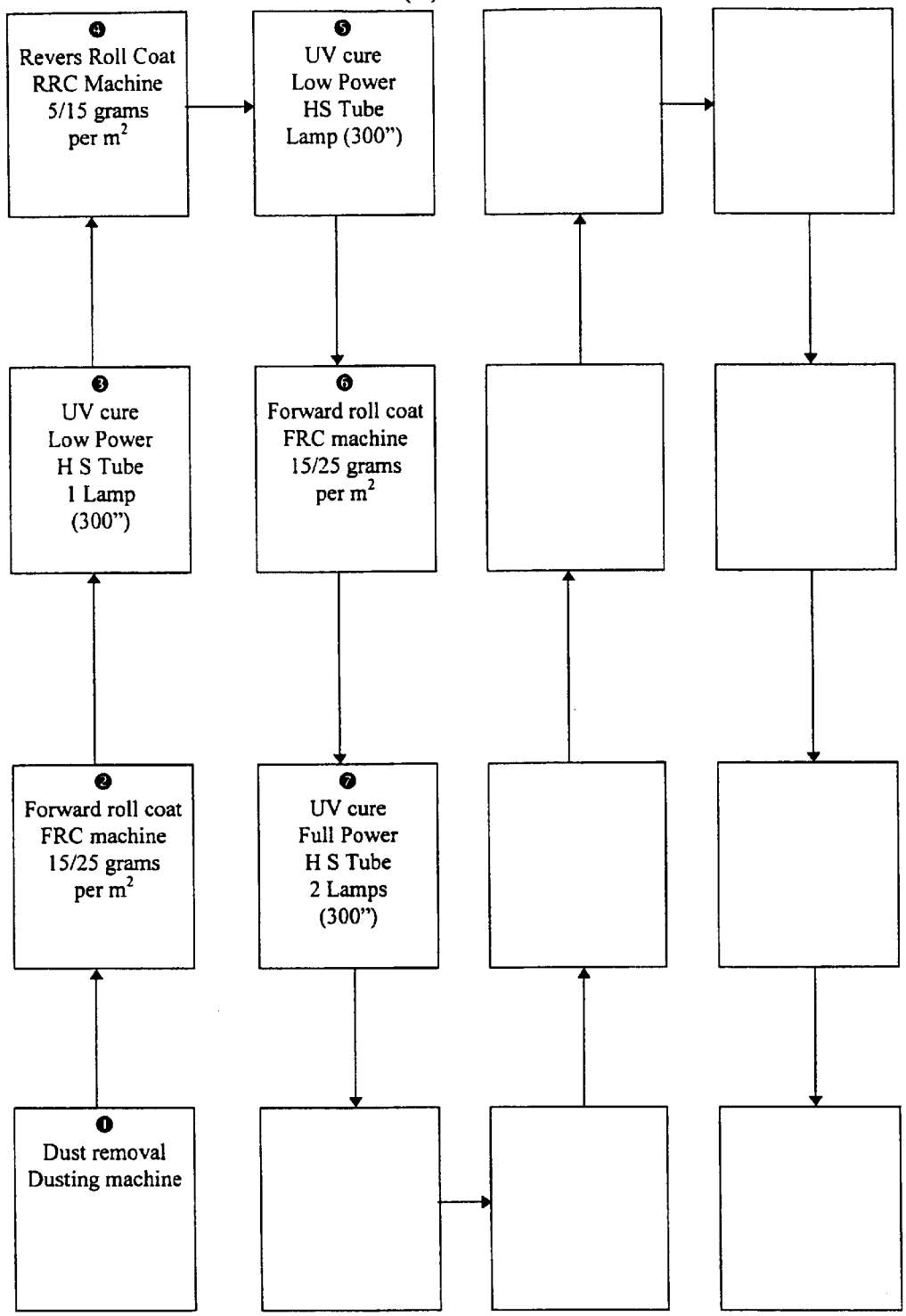
FIG. 11 shows still a further flow arrangement where the substrate is plywood and the output product is a shutter panel system.
Figure 12:
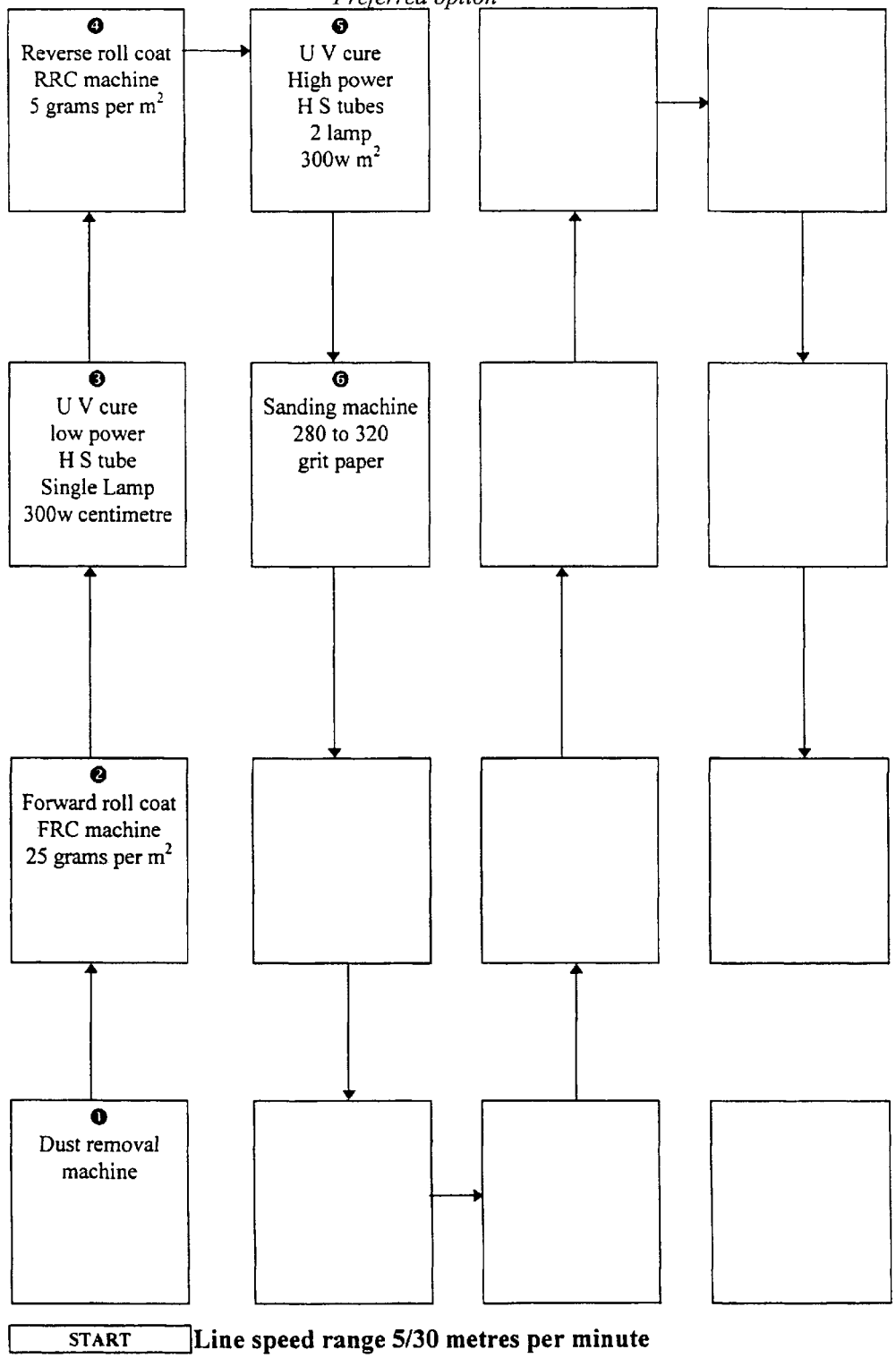
FIG. 12 is a flow diagram suitable for an oil tempered hardboard where the substrate is any one or more of medium density fibre board, particle board, BISON™ board, a wood veneer, a plywood, oriented stand board, etc.

Satisfactory output products are provided by any of the procedures set out in FIGS. 2 through 13 irrespective of whether or not the operating sequence includes any, some or all of the apparatus shown in FIG. 1, the drawing which accompanied the provisional specification of our New Zealand Patent Application 286219.

In respect of the procedures of each of FIGS. 2 through 13, the preferred line speeds are in the ranges stated, namely from 5–30 metres per minute feed and the ranges of application in grams per square metre are in the ranges stated in the drawings (i.e., 5/10 means a range of from 5 to 10). References such as 5/30% in the Examples hereof mean a range of from 5 to 30% volume/volume of the component.

In respect of the choice of materials for the sequences of FIGS. 2 through 13 the following are applicable with each example being a preferment only and then only in respect of options. Each provided a successful outcome.

EXAMPLE 1

UV paint FLEXIPRIME™ (Whitehall) 100% solids UV convertible urethane acrylic with 5/30% v/v catalyst and the balance being UV convertible urethane acrylate (such as sourced from Whitehall Technical Services Limited of South Auckland, New Zealand). FLEXIPRIME™ is a UV cure primer and top coat system for products requiring good flexibility and not at the expense of chemical and weather resistance. Its viscosity is approximately 20 poise and its solids are 100% UV convertible urethane-acrylic. Recommended cures are 15 metres/min. under a 300 watt mercury tube. FLEXITOP™ (Whitehall) can be made gloss or satin.

Preferred cross linkers (variously referred to herein throughout as the key, the catalyst, linker or the like) include a catalyst available from Bayer AG under any of the codes N34, N32, N75, N100, N37 or LS2102.

In the following examples in each instance the cross linker, linker, key or catalyst is one also available from Bayer AG and has the codes given.

EXAMPLE 2

UV paint FLEXIPRIME™ 100% solids UV convertible urethane acrylic with 5/30% v/v (N34, N32, N100, N37 or LS2102).

EXAMPLE 3

Operation 2—Coat with: N34, N32, N75, N100, N37 or LS2102.

Operation 3—Coat with FLEXIPRIME™ UV convertible urethane acrylic with no cross linker.

EXAMPLE 4

FLEXITOP™ 100% solid convertible urethane with 5/30% v/v cross linker (N34, N32, N75, N100, N37 or LS2102).

EXAMPLE 5

FLEXITOP™ 100% solid convertible urethane with 5/30% v/v cross linker (N34, N32, N75, N100, N37 or LS2102).

EXAMPLE 6

FLEXITOP™ 100% solid convertible urethane with 5/30% v/v cross linker (N34, N32, N75, N100, N37 or LS2102).

EXAMPLE 7

FLEXITOP™ 100% solid convertible urethane with 5/30% v/v cross linker (N34, N32, N75, N100, N37 or LS2102).

EXAMPLE 8

FLEXITOP™ 100% solid convertible urethane with 5/30% v/v cross linker (N34, N32, N75, N100, N37 or LS2102).

EXAMPLE 9

FLEXITOP™ 100% solid convertible urethane with 5/30% v/v cross linker (N34, N32, N75, N100, N37 or LS2102).

EXAMPLE 10

FLEXITOP™ 100% solid convertible urethane with cross linker N34, N32, N75, N100, N37 or LS2102 5/30% cross linker.

EXAMPLE 11

UV paint FLEXIPRIME™ solids UV convertible urethane acrylic+cross linker 5/30% N34, N32, N75, N100, N37 or LS2102

EXAMPLE 12

UV paint FLEXIPRIME™ solids UV convertible urethane acrylic+cross linker 5/30% v/v (N34, N32, N75, N100, N37 or LS2102).

From experimentation with the foregoing systems we have found from about 2.5 to 10% v/v of the cross-linker will yield a sandable surface.

From about 15 to 30% v/v cross linker can be used if perfect intercoat adhesion without sanding is required.

In this case a subsequent in-line coat is needed to give immediate stackability without risk of set-off. This is the preferred system to go under an opaque UV-urethane topcoat.

Pot-life is reduced to about a day once cross linker is mixed in.

The advantages of such systems become apparent by comparing:

(A) CONVENTIONAL PAINT PROCESS
1) Substrate arrives on site.
2) Edges are dusted and painted white.
3) Surface is primed using a curtain coater.
4) Product is racked and stored for 10/14 days.
5) Product is sanded and dusted.
6) Product is top coated.
7) Product is racked and cured for seven days at ambient temperature.
8) Product is graded and wrapped.
9) Produce is dispatched.

Process takes 3–4 weeks and uses a labour force of twenty men and administration staff, and (B) DUAL CURE UV SYSTEM OF PRESENT INVENTION
1) Product arrives on site.
2) Product is edge dusted and edges painted white.
3) Product is loaded on to UV line for priming, sanding and top coating.
4) Product is graded and dispatched.

Process takes 0.5 days and employs five men and same administration staff.

What is claimed is:

1. A method of coating a substrate selected from the group consisting of fibrocement and fiber cement, said method comprising at least the steps of:
   (I) at least applying to the surface of the substrate a mono or poly isocyanate catalyzed radiation curable acrylate composition which is also self curing by means of
      (i) serial application of
         (a) a liquid carried solvent free mono or poly isocyanate catalyst, and
         (b) the radiation curable acrylate composition, or
      (ii) an application of a mixture of a solvent free mono or poly isocyanate catalyst and the acrylate composition;
   the application by (I)(i) or (ii) providing a composition having from about 2.5 to about 30% v/v of the catalyst,
   (II) photo curing at least the surface of the coating applied as (I) prior to any self curing
   (III) applying to the surface resulting from (II)
      (i) a radiation curable composition, and/or
      (ii) serially
         (a) a liquid carried solvent free mono or poly isocyanate catalyst, and
         (b) a radiation curable acrylate composition, and/or
      (iii) a mixture of a solvent free mono or poly isocyanate catalyst and the acrylate composition; and
   (IV) curing at least the surface of the coating(s) applied as (III).

2. The method of claim 1, wherein the application by I(i) or (ii) provides a composition having from 5 to about 15% v/v of the catalyst.

3. The method of claim 1, wherein the application by I(i) or (ii) provides a composition having from 2.5 to about 10% v/v of the catalyst.

4. The method of claim 1, wherein the substrate is fibrocement.

5. The method of claim 4, wherein any of the steps (I), (II), (III) and (IV) present are performed on a production line at a line speed of from 5 to 30 m/min.

6. The method of claim 4, wherein step (I) results in an application of composition at a rate of from 5 to 50 grams per square meter.

7. The method of claim 2, wherein the curing in step (IV) is photo curing.

8. The method of claim 1, wherein said catalyst of step (I) is diisocyanate.

9. The method of claim 8, wherein said diisocyanate is aromatic or aliphatic.

10. The method of claim 8, wherein said diisocyanate is polymethylene.

11. The method of claim 8, wherein the catalyst is any catalyst of general formula R—(N=C=O)n, where R is an organic moiety and n is any integer 1 or greater.

12. The method of claim 1, wherein step (I) comprises the application of plural catalysed and radiation curable acrylate coatings, the first being by means of one of (I)(i) and (I)(ii), and the second, the same or different, being by means of one of (I)(i) and (I)(ii).

13. The method of claim 1, wherein said photo curing is with ultraviolet spectrum light.

14. The method of claim 1, wherein step-(III)(i) is used and the radiation curable composition is an acrylate composition or compound.

15. The method of claim 1, wherein step (III)(ii) is used and said catalyst is a diisocyanate.

16. The method of claim 1, wherein step (III)(iii) is used and the catalyst and acrylate composition provide a composition having about 2.5 to about 30% v/v of the catalyst.

17. The method of claim 1, wherein only one of steps (III)(i), (ii) or (iii) are used.

18. The method of claim 1, wherein two of the steps (III)(i), (III)(ii) and (III)(iii) are used.

19. The method of claim 1, further comprising a step (V), after step (IV), which comprises applying at least one compatible coating over the coating applied as (IV), wherein the coating(s) of steps (I) through (IV) have primed the substrate.

20. The method of claim 19, wherein step (V) includes mechanical and/or chemical treatments to modify surface appearance and/or characteristics.

21. The method of claim 1, wherein said substrate includes free water inclusions.

22. The method of claim 1, wherein the radiation curable acrylate is U.V. radiation curable.

* * * * *